(12) United States Patent
Hayaishi

(10) Patent No.: US 11,247,343 B2
(45) Date of Patent: Feb. 15, 2022

(54) ROBOT SYSTEM, POSITIONAL RELATIONSHIP ACQUIRING APPARATUS, AND POSITIONAL RELATIONSHIP ACQUIRING METHOD

(71) Applicant: KEISUUGIKEN CORPORATION, Osaka (JP)

(72) Inventor: Naohiro Hayaishi, Osaka (JP)

(73) Assignee: KEISUUGIKEN CORPORATION, Osaka (JP)

( * ) Notice: Subject to any disclaimer, the term of this patent is extended or adjusted under 35 U.S.C. 154(b) by 223 days.

(21) Appl. No.: 16/467,266

(22) PCT Filed: Dec. 6, 2017

(86) PCT No.: PCT/JP2017/043749
§ 371 (c)(1),
(2) Date: Jun. 6, 2019

(87) PCT Pub. No.: WO2018/105635
PCT Pub. Date: Jun. 14, 2018

(65) Prior Publication Data
US 2020/0189118 A1    Jun. 18, 2020

(30) Foreign Application Priority Data
Dec. 7, 2016   (JP) .............................. JP2016-237571

(51) Int. Cl.
*B25J 11/00*     (2006.01)
*B25J 9/08*      (2006.01)
(Continued)

(52) U.S. Cl.
CPC ............... *B25J 11/003* (2013.01); *B25J 9/08* (2013.01); *B25J 9/1674* (2013.01); *B25J 13/088* (2013.01)

(58) Field of Classification Search
CPC . B25J 11/003; B25J 9/1674; B25J 9/08; B25J 13/088
(Continued)

(56) References Cited

U.S. PATENT DOCUMENTS 7,765,023 B2 *   7/2010   Oaki .................. B25J 9/1692
                                              700/157
2005/0246061 A1 * 11/2005 Oaki .................. B25J 9/1692
                                              700/245

FOREIGN PATENT DOCUMENTS

JP     5892531 B1     3/2016
JP     6108645 B1     4/2017
(Continued)

OTHER PUBLICATIONS

Extended European Search Report issued in corresponding European Patent Application No. 17 87 8299 dated Jun. 12, 2020.
(Continued)

*Primary Examiner* — Khoi H Tran
*Assistant Examiner* — Rodney P King
(74) *Attorney, Agent, or Firm* — Troutman Pepper Hamilton Sanders LLP

(57) ABSTRACT

To provide a positional relationship acquiring apparatus that can acquire the positional relationship between a plurality of rotation shafts that are driven by a plurality of motors, without a user manually performing setting or the like.
A positional relationship acquiring apparatus includes: a motor control unit that controls a plurality of motors of a robot that has a plurality of rotation shafts that are respectively driven by the plurality of motors; a receiving unit that receives angular velocities that have been acquired by a plurality of angular velocity sensors that are respectively provided for the plurality of rotation shafts; and a positional relationship acquiring unit that acquires a positional relationship between the plurality of rotation shafts, using the
(Continued)

angular velocities acquired by the plurality of angular velocity sensors and received by the receiving unit when the plurality of rotation shafts have been rotated by the motor control unit one by one.

6 Claims, 11 Drawing Sheets

(51) Int. Cl.
    *B25J 9/16* (2006.01)
    *B25J 13/08* (2006.01)
(58) Field of Classification Search
    USPC .......................................................... 700/245
    See application file for complete search history.

(56) References Cited

FOREIGN PATENT DOCUMENTS

| KR | 10-1747934 B1 | 6/2017 |
| WO | 2014/010004 A1 | 1/2014 |
| WO | 2014/165313 A1 | 10/2014 |

OTHER PUBLICATIONS

International Search Report issued in corresponding International Patent Application No. PCT/JP2017/043749 dated Feb. 27, 2018.

\* cited by examiner

| ROTATION-TARGET ROTATION SHAFT | ROTATION SHAFT WITH LOW ANGULAR VELOCITY | ROTATION SHAFT WITH HIGH ANGULAR VELOCITY |
|---|---|---|
| P0 | P3-P11 | P1, P2 |
| P1 | P0, P3-P11 | P2 |
| P2 | P0, P1, P3-P11 | — |
| P3 | P4, P5 | P0-P2, P6-P11 |
| P4 | P5 | P0-P3, P6-P11 |
| P5 | — | P0-P4, P6-P11 |
| P6 | P0-P5, P9-P11 | P7, P8 |
| P7 | P0-P6, P9-P11 | P8 |
| P8 | P0-P7, P9-P11 | — |
| P9 | P10, P11 | P0-P8 |
| P10 | P11 | P0-P9 |
| P11 | — | P0-P10 |

FIG.6

| ROTATION SHAFT ID | ROTATION SHAFT ID OF FIRST END-SIDE ROTATION SHAFT | ROTATION SHAFT ID OF SECOND END-SIDE ROTATION SHAFT |
|---|---|---|
| P2 | FREE END | P1 |
| P1 | P2 | P0 |
| P0 | P1 | P3, P6, P9 |

FIG.7A

| ROTATION SHAFT ID | ROTATION SHAFT ID OF FIRST END-SIDE ROTATION SHAFT | ROTATION SHAFT ID OF SECOND END-SIDE ROTATION SHAFT |
|---|---|---|
| P5 | GROUNDED END | P4 |
| P4 | P5 | P3 |
| P3 | P4 | P0, P6, P9 |

FIG.7B

| ROTATION SHAFT ID | ROTATION SHAFT ID OF FIRST END-SIDE ROTATION SHAFT | ROTATION SHAFT ID OF SECOND END-SIDE ROTATION SHAFT |
|---|---|---|
| P51 | FREE END | P52 |
| P52 | P51 | P53 |
| P53 | P52 | P54 |
| P54 | P53 | FREE END |

FIG.7C

ROBOT SYSTEM, POSITIONAL RELATIONSHIP ACQUIRING APPARATUS, AND POSITIONAL RELATIONSHIP ACQUIRING METHOD

CROSS REFERENCE TO RELATED APPLICATIONS

This is a U.S. National Phase Application under 35 U.S.C. § 371 of International Patent Application No. PCT/JP2017/043749, filed Dec. 6, 2017, which claims priority of Japanese Patent Application No. 2016-237571, filed Dec. 7, 2016. The entire contents of which are hereby incorporated by reference.

TECHNICAL FIELD

The present invention relates to, for example, a positional relationship acquiring apparatus that acquires the positional relationship between a plurality of rotation shafts of a robot.

BACKGROUND

Conventionally, in an industrial robot or the like, a correspondence relationship between a plurality of motors and a plurality of joints for a link row (manipulators) is known in advance. Therefore, there is no need to detect which rotation shaft is rotated by each motor.

In contrast, when a user creates an entertainment robot by himself/herself, the user needs to manually set a relationship between the plurality of motors and the plurality of rotation shafts of the robot. Otherwise, when controlling the robot, the user cannot discern which rotation shaft will be rotated upon each motor being controlled.

JP Patent No. 5892531 is an example of a patent document related to an entertainment robot.

SUMMARY

However, the task for the user to manually set a relationship between motors and rotation shafts is highly complex. In addition, there is a problem in that, if the user sets an incorrect relationship, the robot does not accurately operate, and the task of finding out which setting is incorrect is an excessive burden for an inexperienced user.

The present invention has been made to solve the above-described problems, and aims to provide, for example, a positional relationship acquiring apparatus that is capable of acquiring the positional relationship between rotation shafts of a robot that has a plurality of rotation shafts that are respectively driven by a plurality of motors.

To achieve the above-described aim, a positional relationship acquiring apparatus according to the present invention includes: a motor control unit that controls a plurality of motors of a robot that has a plurality of rotation shafts that are respectively driven by the plurality of motors; a receiving unit that receives angular velocities that have been acquired by a plurality of angular velocity sensors that are respectively provided for the plurality of rotation shafts; and a positional relationship acquiring unit that acquires a positional relationship between the plurality of rotation shafts, using the angular velocities acquired by the plurality of angular velocity sensors and received by the receiving unit when the plurality of rotation shafts have been rotated by the motor control unit one by one.

With such a configuration, it is possible to acquire the positional relationship between a plurality of rotation shafts that are driven by a plurality of motors, without a user manually performing setting or the like. As a result, user convenience is improved. Also, compared to a case where user performs setting, it is possible to reduce the likelihood of incorrect setting happening, and as a result, the robot appropriately operates.

Also, in the positional relationship acquiring apparatus according to the present invention, the robot may have a link row that includes a plurality of links that are coupled to each other by a plurality of joints that respectively correspond to the plurality of rotation shafts, and the positional relationship may be the positional relationship between the rotation shafts in the link row.

With such a configuration, it is possible to acquire the arrangement of the rotation shafts in the link row that the robot has.

Also, in the positional relationship acquiring apparatus according to the present invention, when a rotation shaft is rotated and angular velocities acquired by angular velocity sensors provided for the other rotation shafts have first and second values, the positional relationship acquiring unit may determine that the rotated rotation shaft is present between: one or more rotation shafts from which the angular velocity of the first value has been acquired; and one or more rotation shafts from which the angular velocity of the second value has been acquired.

With such a configuration, it is possible to acquire the positional relationships between the rotation shafts, based on the fact that the angular velocities of the rotation shafts on the same side are the same.

Also, in the positional relationship acquiring apparatus according to the present invention, when a rotation shaft at the leading end of the link row is rotated, if angular velocities acquired by angular velocity sensors provided for the other rotation shafts are lower than a threshold value, the positional relationship acquiring unit may determine that the leading end is a free end, and if the angular velocities are higher than the threshold value, the positional relationship acquiring unit may determine that the leading end is a grounded end.

With such a configuration, it is possible to determine whether the leading end of the link row is a leading end or a grounded end.

Also, in the positional relationship acquiring apparatus according to the present invention, the positional relationship acquiring unit may acquire a relative angle between two rotation shafts that are adjacent to each other.

With such a configuration, it is possible to acquire, for example, more detailed information regarding the robot, using the acquired relative angle between the two rotation shafts that are adjacent to each other. Such information may be used to, for example, calculate the position of the leading end of the link row based on forward kinematics, or calculate the angles of the joints of the link row based on inverse kinematics.

Also, the positional relationship acquiring apparatus according to the present invention may further include a determination unit that determines the type of the robot, using the positional relationship between the rotation shafts, acquired by the positional relationship acquiring unit.

With such a configuration, it is possible to automatically determine the type of the robot.

Also, the positional relationship acquiring apparatus according to the present invention may further include a profile acquiring unit that acquires an action profile corresponding to the type of the robot determined by the determination unit, and the motor control unit may control the plurality of motors using the action profile acquired by the profile acquiring unit.

With such a configuration, if the robot that has been subjected to the determination is a humanoid robot, it is possible to perform control such that the robot that has been subjected to the determination behaves as a humanoid robot, using action profiles corresponding to a humanoid robot.

Also, the positional relationship acquiring apparatus according to the present invention may further include: an inertia moment calculation unit that uses the torque of a rotation shaft when the rotation shaft is rotated by the motor control unit, and an angular velocity that has been acquired by the angular velocity sensor of a link row on the leading end-side of the rotation shaft, to calculate, for the rotation shaft, the moment of inertia regarding a link row on the leading end side of the rotation shaft, and the motor control unit may control the plurality of motors using the moment of inertia calculated by the inertia moment calculation unit.

With such a configuration, it is possible to perform more appropriate motor feedback control.

A robot system according to the present invention includes: the above-described positional relationship acquiring apparatus; and a robot that has the plurality of angular velocity sensors, the plurality of motors, and the plurality of rotation shafts that are respectively rotated by the plurality of motors.

A positional relationship acquiring method according to the present invention includes: a motor control step of controlling a plurality of motors of a robot that has a plurality of rotation shafts that are respectively driven by the plurality of motors, thereby rotating the plurality of rotation shafts one by one; a receiving step of, when the plurality of rotation shafts are rotated one by one in the motor control step, receiving angular velocities that have been acquired by a plurality of angular velocity sensors that are respectively provided for the plurality of rotation shafts; and a positional relationship acquiring step of acquiring a positional relationship between the plurality of rotation shafts, using the angular velocities that have been acquired by the plurality of angular velocity sensors when the plurality of rotation shafts have been rotated one by one.

With the positional relationship acquiring apparatus and so on according to the present invention, it is possible to acquire the positional relationship between a plurality of rotation shafts that are driven by a plurality of motors without the user manually performing setting or the like, which improves user convenience.

BRIEF DESCRIPTION OF DRAWINGS

FIG. 6 is a diagram showing an example of a relationship between a rotation shaft that is to be rotated and a detected angular velocity according to the embodiment.

FIG. 7A is a diagram showing an example of an acquired positional relationship between rotation shafts according to the embodiment.

FIG. 7B is a diagram showing an example of an acquired positional relationship between rotation shafts according to the embodiment.

FIG. 7C is a diagram showing an example of an acquired positional relationship between rotation shafts according to the embodiment.

DETAILED DESCRIPTION

Figure 1:
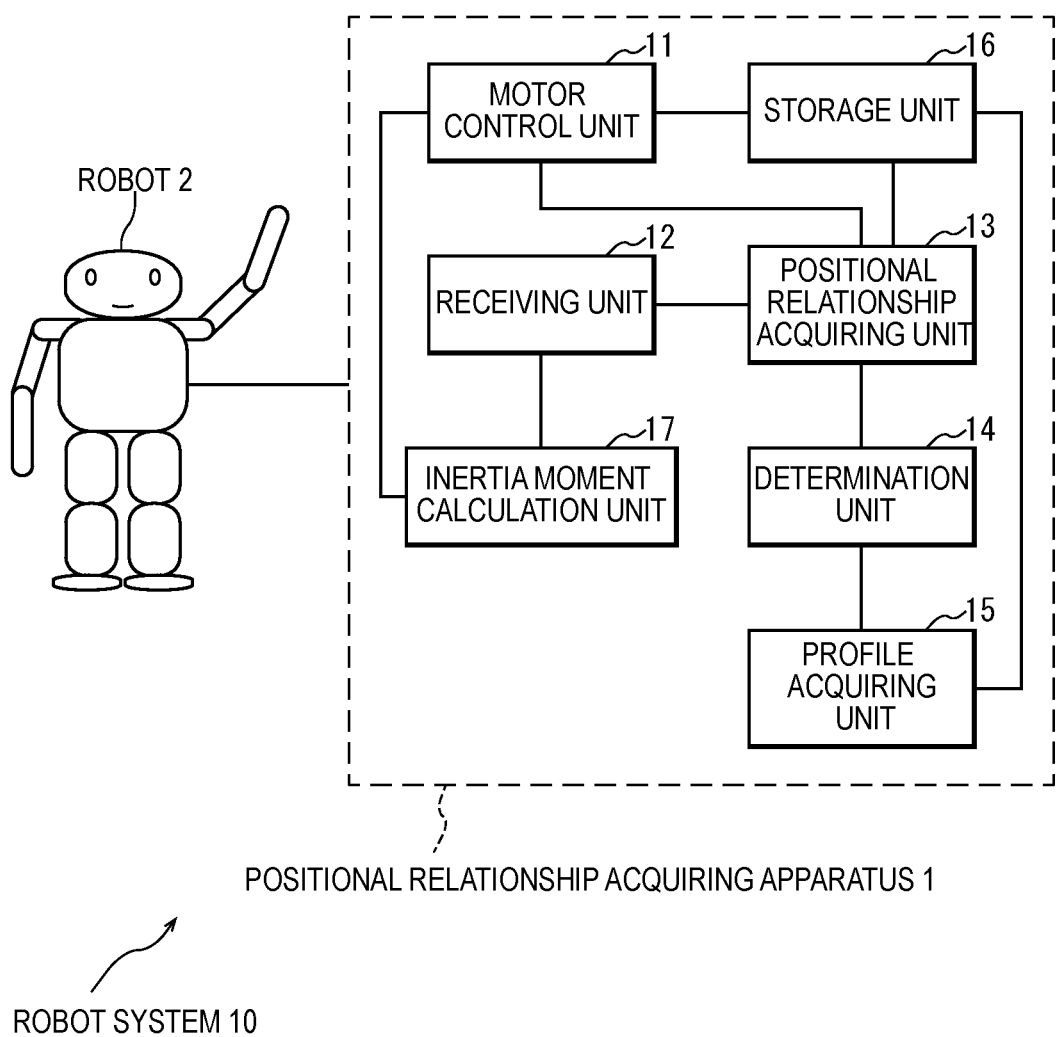
FIG. 1 is a diagram showing a configuration of a robot system according to an embodiment of the present invention.

The following describes a positional relationship acquiring apparatus according to the present invention based on an embodiment. Note that, in the embodiment below, constituent elements and steps that are assigned the same reference numerals are the same or equivalent, and redundant descriptions may be omitted. A robot system according to the present embodiment includes a robot and a positional relationship acquiring apparatus that acquires the positional relationship between a plurality of rotation shafts that are driven by a plurality of motors in the robot.

FIG. 1 is a diagram showing a configuration of a robot system 10 according to the present embodiment. The robot system 10 according to the present embodiment includes a positional relationship acquiring apparatus 1 and a robot 2. The robot 2 includes a plurality of motors, a plurality of rotation shafts that are respectively driven by the plurality of motors, and a plurality of angular velocity sensors that are respectively provided for the plurality of rotation shafts. The robot 2 may have one or more link rows that each include a plurality of links that are coupled to each other via a plurality of joints respectively corresponding to the plurality of rotation shafts. The present embodiment mainly describes such a case. Although the present embodiment mainly describes a case where the robot 2 is a humanoid robot, the present invention is not limited to such a case. The robot 2 may be, for example, an animal robot that has the shape of a dog, a cat, a bird, a fish, a snake, an insect, or the like, or a robot that has another shape. The robot 2 is typically a toy robot, i.e. an entertainment robot, a service robot, a home robot, or the like, but is not limited to them. Also, each rotation shaft of the robot 2 may operate objects other than the joints of a link row. For example, the rotation shafts may be rotation shafts of travel parts such as wheels or continuous tracks, or rotation shafts of rotor blades. For example, in the former case, the robot 2 is a travel robot, and in the latter case, the robot 2 is a flying robot. A flying robot may be, for example, a helicopter, or a multicopter that has three or more rotor blades (rotors). A multicopter may be, for example, a quadrotor having four rotor blades, or a multicopter that has another number of rotor blades. Note that a robot 2 that is a travel robot or a flying robot may include a link row.

Figure 3:
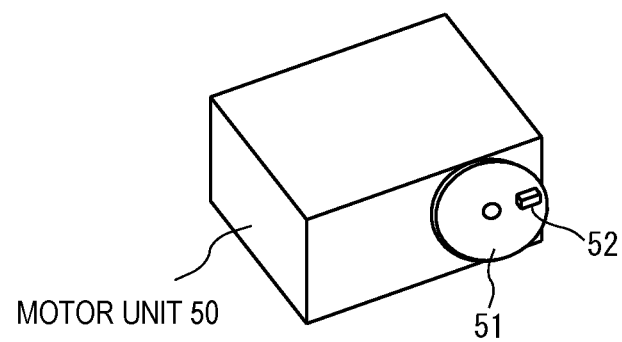
FIG. 3 is a diagram showing an example of a motor unit according to the embodiment.

FIG. 3 is a diagram showing an example of a motor unit 50 included in the robot 2. A motor is housed in the housing of the motor unit 50, and the motor rotates a rotary plate 51. A link or the like is connected to the rotary plate 51, and thus the link or the like is driven by the motor. Note that the motor may rotate the rotary plate 51 using a decelerator or the like, for example. An angular velocity sensor 52 is attached to the rotary plate 51. Typically, it is preferable that the angular velocity sensor 52 is provided eccentrically relative to the rotation shaft of the rotary plate 51. This is in order to make it possible to acquire an angular velocity regarding the rotary plate 51 as well. In contrast, if there is no need to acquire an angular velocity regarding the rotary plate 51, the angular velocity sensor 52 may be provided for the rotation shaft. The angular velocity sensor 52 may be a sensor that is capable of acquiring a two-dimensional angular velocity (e.g. an angular velocity regarding rotation of the rotary plate 51 in the plane direction thereof), or a sensor that is capable of acquiring a three-dimensional angular velocity. The present embodiment mainly describes the latter case. Although the present embodiment mainly describes a case where the joints of a link row are driven by the motor unit 50 shown in FIG. 3, the present invention is not limited to such a case. For example, links of a link row may be connected directly to a rotation shaft that is driven by a motor, and an angular velocity sensor may be attached to a portion of a link that is in the vicinity of the rotation shaft. In any case, it is preferable that an angular velocity sensor acquires an angular velocity on each rotation shaft of the robot 2. That is to say, it is preferable that an angular velocity sensor is provided near a rotation shaft. Also, in the robot 2, the shaft of a motor may be or may not be coaxial with a rotation shaft. In the latter case, for example, rotation of the shaft of a motor may be transmitted to a rotation shaft via a gear, a pulley and a belt, or the like. In such a case, for example, a gear, a pulley, or the like may be regarded as a rotary plate. Note that the angle of the rotation shaft, i.e. the angle of the rotary plate 51, of the motor unit 50 may be acquirable. The angle of the rotation shaft may be, for example, acquired by an encoder, or acquired by integrating angular velocities that have been acquired by the angular velocity sensor 52, or acquired using another method. Although FIG. 3 shows a case where the motor unit 50 has the rotary plate 51, the present invention is not limited to such a case. The motor unit 50 may also have a member that is driven by a motor, other than the rotary plate 51. In such a case, a link or the like may be connected to the member, and the link or the like may be driven by the motor. In a case where a motor unit 50 that has a motor and an angular velocity sensor 52 is used, the motor and the angular velocity sensor 52 are associated with each other. Therefore, it is possible to know a correspondence between a certain angular velocity sensor 52 and a motor that rotates a rotation shaft on which the angular velocity sensor 52 is provided. Even if a motor unit 50 is not used, it is preferable that an angular velocity sensor and a motor are associated with each other in a similar manner. That is to say, it is preferable that a correspondence between an angular velocity sensor and a motor that rotates the rotation shaft on which the angular velocity sensor is provided is discernible. This is because it is preferable that which rotation shaft (joint) each angular velocity sensor corresponds to is discernible.

The positional relationship acquiring apparatus 1 includes a motor control unit 11, a receiving unit 12, a positional relationship acquiring unit 13, a determination unit 14, a profile acquiring unit 15, a storage unit 16, and an inertia moment calculation unit 17. The positional relationship acquiring apparatus 1 may be an apparatus that only acquires the positional relationship between the rotation shafts of the robot 2, or an apparatus that also serves as a robot control apparatus that controls the movement of the robot 2. The present embodiment mainly describes the latter case. Also, the positional relationship acquiring apparatus 1 may be provided separately from the robot 2, or attached to the robot 2. In the latter case, the positional relationship acquiring apparatus 1 and the robot 2 may be integrated.

The motor control unit 11 controls the motors of the robot 2. The motor control unit 11 may perform feedback control on the motors such that the rotation shafts are positioned at desired angles, for example. In such a case, the motor control unit 11 may use angles acquired from the rotation shafts. Also, the motor control unit 11 may perform servo control on the motors, for example.

The receiving unit 12 receives angular velocities that have been acquired by the plurality of angular velocity sensors respectively provided for the plurality of rotation shafts. Preferably, regarding each of the plurality of angular velocities thus received, it is possible to discern the rotation shaft from which the angular velocity has been acquired by the angular velocity sensor provided therefor. For example, if the motors and the angular velocity sensors are associated with each other as described above, it is also possible to discern the relationship between the angular velocities received by the receiving unit 12 and the motors. The receiving unit 12 may or may not include a device for receiving angular velocities. The receiving unit 12 may be realized using hardware, or software such as a driver that drives a predetermined device.

Figure 4:
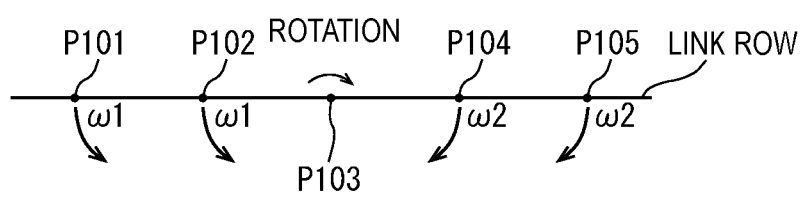
FIG. 4 is a diagram illustrating an angular velocity corresponding to rotation of a rotation shaft according to the embodiment.

The positional relationship acquiring unit 13 acquires the positional relationship between the rotation shafts, using the respective angular velocities of the plurality of angular velocity sensors, which are received by the receiving unit 12 when the motor control unit 11 rotates the plurality of rotation shafts one by one. The positional relationship between the rotation shafts may be the positional relationship between the rotation shafts (the joint shafts) included in a link row. The positional relationship between rotation shafts that are included in a link row of the robot 2 may also be regarded as a link relationship between the rotation shafts or the arrangement of the rotation shafts. The positional relationship between the rotation shafts in a link row may be the order in which the rotation shafts are arranged from one end to the other end of the link row, for example. The positional relationship between the rotation shafts may be regarded as the arrangement relationship between the rotation shafts. Specifically, as shown in FIG. 4, if a rotation shaft P103 rotates and the other rotation shafts P101, P102, P104, and P105 are not rotated, the rotation shafts on one side of the rotation shaft P103 that rotates rotate at an angular velocity of ω1, and the rotation shafts on the other side rotate at a different angular velocity ω2. This is for the following reason. If a rotation shaft is rotated, a link row on the side of the body of the motor with respect to the rotation shaft and a link row on the side of the shaft of the motor with respect to the rotation shaft, i.e. link rows on the two sides that rotate relative to each other due to the rotation shaft rotating, usually do not have exactly the same structure or weight, and therefore one side more easily rotates than the other side. As a result, the angular velocity of the one side becomes higher than that of the other side. In FIG. 4, in order to simplify description, the angular velocities of the rotation shafts P101 and P102 are denoted as ω1, and the angular velocities of the rotation shafts P104 and P105 are denoted as ω2. However, the angular velocities of the rotation shafts P101 and P102 need only be the same in terms of falling within the range of tolerance, and the angular velocities of the P104 and P105 need only be the same in terms of falling within the range of tolerance. As described above, if a rotation shaft P103 rotates and the angular velocities acquired by the angular velocity sensors provided for the other rotation shafts P101, P102, P104, and P105 are a first value ω1 and a second value ω2, it can be determined that the rotation shaft P103 that has rotated is located between: one or more rotation shafts P101 and P102 from which the angular velocity of the first value ω1 has been acquired; and one or more rotation shafts P104 and P105 from which the angular velocity of the second value ω2 has been acquired. Therefore, by rotating a rotation-target rotation shaft, and using the angular velocities of rotation shafts other than the rotation target, which have been received at the time, the positional relationship acquiring unit 13 can determine that the rotation-target rotation shaft is located between a first group and a second group of the rotation shafts other than the rotation target. Then the positional relationship acquiring unit 13 switches the rotation target to another rotation shaft one after the other, and similarly acquires the result of determination for all of the rotation shafts. Thereafter, the positional relationship acquiring unit 13 integrates the results of determination, and thus can acquire the positional relationship between the rotation shafts. Note that when rotating a rotation shaft, the positional relationship acquiring unit 13 may classify a plurality of angular velocities acquired from the other rotation shafts into two groups through a known clustering method, and determine that the rotation-target rotation shaft is located between: one or more rotation shafts corresponding to a first angular velocity group; and one or more rotation shafts corresponding to a second angular velocity group. If this is the case, for example, it can be envisaged that the angular velocity of the first group is ω1 and the angular velocity of the second group is ω2, or the other way around.

Note that, if the positional relationship acquiring unit 13 rotates a rotation shaft using the motor control unit 11, such rotation may be one-way rotation or back and forth rotation. In the latter case, the range of rotation may be reduced. With such a configuration, it is possible to acquire the positional relationship between the rotation shafts without significantly changing the current orientation or position of the robot 2. For example, if the rotation shaft of a leg of a humanoid robot is significantly changed, there is the possibility of the robot 2 falling. From such a point of view, it is preferable that the rotation-target rotation shaft is rotated back and forth within a small range. Also, when a rotation-target rotation shaft is rotated, for example, the maximum value of an angular velocity that is to be acquired by the angular velocity sensor 52 while the rotation-target rotation shaft is rotated may be used as the angular velocity of the rotation shafts other than the rotation-target rotation shaft, which is acquired by the angular velocity sensor 52. The maximum value may be the maximum value of the absolute value of the angular velocity. For example, if the angle of the rotation-target rotation shaft is changed using a trigonometric function that takes time as an argument, the angular velocity that is to be acquired by the angular velocity sensor 52 also changes along with time. Therefore, in order to acquire the positional relationship between the rotation shafts, it is preferable that a predetermined angular velocity such as the maximum value is used.

A link row typically includes one or more links. If a link row includes two or more links, the two or more links may be coupled to each other via joint(s) corresponding to rotation shafts. A link row typically has a base end and a leading end. For example, in the case of a link row corresponding to an arm of a humanoid robot, the hand side is the leading end side and the shoulder side is the base end side. Note that, as in the case of a humanoid robot, if link rows of arms and legs are connected to the body, it can also be envisaged that a plurality of rotation shafts are adjacent to the rotation shaft at the base end of a link row. For example, in the robot 2 shown in FIG. 5, it can be envisaged that a rotation shaft P0 at the base end of the link row corresponding to the arm is adjacent to rotation shafts P3, P6, and P9 at the base ends of other link rows. Therefore, the base end of a link row may be regarded as a multiple connection end that is connected to each of the base ends of a plurality of link rows. Note that the leading end of a link row may be a free end or a grounded end. A free end is a leading end that is not in contact with the ground, the floor, or the like, such as a hand of a humanoid robot, or a rotor blade of a flying robot. A grounded end is a leading end that is in contact with the ground, the floor, or the like, such as a foot of a humanoid robot or a travel part of a travel robot. Although one end of a link row is a base end and the other end is a leading end that is a free end or a grounded end in the above description, the present invention is not limited to such a case. For example, as in a snake robot, both ends of a link row may be leading ends. In the case of a snake robot, typically, the leading ends on both sides are free ends. In the case of a link row whose both ends are leading ends as in a snake robot is also considered, a first end of a link row is one of a base end, a free end, and a grounded end, and a second end is one of a free end and a grounded end. Therefore, if link rows are classified based on combinations of the first and second ends, there are six (2×3) link row types. However, a link row of which the first end is a free end and the second end is a grounded end and a link row of which the first end is a grounded end and the second end is a free end are the same, and therefore there are five types of link rows.

The following describes how to determine whether a leading end of a link row is a free end or a grounded end. When a rotation shaft at a leading end of a link row rotates, the positional relationship acquiring unit 13 may determine that the leading end is a free end if the angular velocity acquired by the angular velocity sensors provided for the other rotation shafts is lower than a threshold value, and determine that the leading end is a grounded end if the angular velocity is higher than the threshold value. For example, in the robot 2 shown in FIG. 5, if the rotation shaft P2 at the free end is rotated, only the hand moves significantly, and the other rotation shafts such as rotation shaft P1 do not move very much. In contrast, if the rotation shaft P5 at the grounded end is rotated, typically, the state of being grounded changes, and the rotation shafts other than the rotation shaft P5 move accordingly. Therefore, when a rotation shaft at a leading end of a link row rotates, the positional relationship acquiring unit 13 may determine that the rotation-target rotation shaft is a rotation shaft at a free end if the angular velocity of the other rotation shafts is lower than a predetermined threshold value, and determine that the rotation-target rotation shaft is a rotation shaft at a grounded end if the angular velocity of the other rotation shafts is higher than the predetermined threshold value. Note that if the angular velocity of the rotation shafts other than the rotation-target rotation shaft is equal to the threshold value, the positional relationship acquiring unit 13 may determine that the rotation-target rotation shaft is a rotation shaft at a free end, or a rotation shaft at a grounded end. In this way, it is possible to determine whether the leading end of a link row is a leading end or a grounded end. As a result, in the case of a humanoid robot, for example, it is possible to discern whether the leading end of a link row is a hand or a foot.

The positional relationship acquiring unit 13 may acquire a relative angle between two adjacent rotation shafts. Note that a first rotation shaft and a second rotation shaft may be regarded as rotation shafts that are adjacent to each other if no other rotation shaft that changes the relative angle between the first rotation shaft and the second rotation shaft is present between the first rotation shaft and the second rotation shaft. For example, in the robot 2 shown in FIG. 5, the rotation shafts P1 and P2 are rotation shafts that are adjacent to each other, and the rotation shafts P0 and P3 are also rotation shafts that are adjacent to each other. On the other hand, the rotation shafts P1 and P3 are not rotation shafts that are adjacent to each other because the rotation shaft P1 is present between them. It is possible to acquire such a relative angle by measuring a three-dimensional angular velocity using the angular velocity sensors provided for the first and second rotation shafts. For example, in a case where a first rotation shaft rotates, by measuring an angular velocity in a three-dimensional coordinate system using the angular velocity sensor provided for a second rotation shaft that is adjacent to the first rotation shaft, it is possible to discern the direction of the first rotation shaft relative to the angular velocity sensor provided for the second rotation shaft. Typically, the direction of the angular velocity is the direction of the first rotation shaft. Here, when one of two rotation shafts that are adjacent to each other is rotated, the position of the other rotation shaft may or may not move. For example, in the robot 2 shown in FIG. 5, if the rotation shaft P1 of the rotation shafts P1 and P2 that are adjacent to each other is rotated, the position of the rotation shaft P2 moves, whereas if the rotation shaft P2 is rotated, the position of the rotation shaft P1 hardly moves. Therefore, when a relative angle is to be acquired, it is preferable that the positional relationship acquiring unit 13 determines, as the rotation target, a rotation shaft that can move the position of the other rotation shaft upon being rotated, of two rotation shafts that are adjacent to each other. Such a rotation-target rotation shaft is typically a base end-side rotation shaft of two rotation shafts that are adjacent to each other if the leading end of the link row is a free end, and is typically a rotation shaft on the leading end-side if the leading end of the link row is a grounded end. It is assumed that the direction of the second rotation shaft relative to the angular velocity sensor provided for the second rotation shaft is known. As a result, it is possible to acquire angles of the first rotation shaft and the second rotation shaft relative to each other. If the direction of the second rotation shaft relative to the angular velocity sensor provided for the second rotation shaft is unknown, and the motor unit 50 is that shown in FIG. 3, it is possible to discern the direction of the second rotation shaft relative to the angular velocity sensor provided for the second rotation shaft by, for example, rotating the second rotation shaft, and acquiring a three-dimensional angular velocity using the angular velocity sensor 52 provided for the second rotation shaft. If the second rotation shaft is attached to the rotary plate 51 so as to be orthogonal thereto, the direction of the angular velocity acquired by the angular velocity sensor provided for the rotary plate 51 is the direction of the second rotation shaft. The angle of the second rotation shaft at the time the angular velocity is acquired from the second rotation shaft may be used to acquire a relative angle between the first and second rotation shafts. Such an angle of the second rotation shaft can be acquired by, for example, using an encoder or integrating angular velocities of the second rotation shaft, as described above.

Note that information indicating the positional relationship acquired by the positional relationship acquiring unit 13 may be stored in the storage unit 16 or a recording medium (not shown). The positional relationship acquiring apparatus 1 may only use an angular velocity that is higher than or equal to a predetermined threshold value from among the acquired angular velocities. Therefore, for example, the receiving unit 11 may only receive an angular velocity that is higher than or equal to the threshold value, and set "0" to an angular velocity that is lower than the threshold value. As described above, in a case where the maximum value of an angular velocity is used, if the maximum value of an angular velocity is lower than a predetermined threshold value, the angular velocity may be set to "0". Note that the positional relationship acquiring apparatus 1 may include an output unit (not shown) that outputs the positional relationship between rotation shafts acquired by the positional relationship acquiring unit 13. The output therefrom may be, for example, display on a display device, transmission to a predetermined device via a communication network, printing using a printer, or accumulation in a recording medium. Note that the output unit may or may not include a device that performs output (e.g. a communication device or a display device). The output unit may be realized using hardware, or realized using software such as a driver that drives such a device.

The determination unit 14 determines the type of the robot 2, using the positional relationship of the rotation shafts acquired by the positional relationship acquiring unit 13. The determination unit 14 may use, for example, correspondence information that associates features of positional relationships and types of robots corresponding thereto to each other, to determine the type of the robot 2. The determination unit 14 may use the type of a link row as the positional relationship between rotation shafts. The type of a link row may be one of the above-described five types classified based on combinations of rotation shafts at the ends of the link row. Specifically, if a robot 2 has two link rows that each have a free end and a base end and two link rows that each have a grounded end and a base end, the determination unit 14 may determine that the robot 2 is a humanoid robot. If a robot 2 has four link rows that each have a grounded end and a base end, the determination unit 14 may determine that the robot 2 is a quadrupedal walking animal robot. If a robot 2 has four link rows that each have a grounded end and a base end and one link row that has a free end and a base end, the determination unit 14 may determine that the robot 2 is a quadrupedal walking animal robot with a tail. If a robot 2 has one link row whose both ends are free ends, the determination unit 14 may determine the robot 2 as a snake robot. The determination unit 14 may determine the type of a robot 2 as "a humanoid robot", "an animal robot", or the like, or as "a humanoid robot that has three shafts as legs and three shafts as arms", "a humanoid robot that has four shafts as legs and two shafts as arms", "an animal robot that has four shafts as front legs and three shafts as rear legs", or the like. In the latter case, the number of shafts (the number of joints) in a link row is also included in the type of robot 2. If such determination is to be performed, it is preferable that the robot 2 is placed on a placing surface in a normal state when a positional relationship is to be acquired by the positional relationship acquiring unit 13. For example, in the cases of a humanoid robot and an animal robot, a positional relationship may be acquired when they are in a standing position, and in the cases of a travel robot and a flying robot, a positional relationship may be acquired when they are in a state where they can travel or fly. This is in order to realize appropriate determination. The determination unit 14 can similarly determine the type of the robot 2 even if the rotation shaft is a rotation shaft of a travel part such as a wheel or a rotation shaft of a rotor blade. For example, if a robot 2 has four rotation shafts that each have a free end, the determination unit 14 may determine that the robot 2 is a flying robot that has four rotor blades. Also, for example, if a robot 2 has four rotation shafts that each have a grounded end, the determination unit 14 may determine that the robot 2 is a travel robot that has four wheels. Also, the result of determination performed by the determination unit 14 may be stored in a recording medium (not shown).

The profile acquiring unit 15 acquires an action profile corresponding to the type of the robot 2 determined by the determination unit 14. The profile acquiring unit 15 may download an action profile corresponding to the result of determination by accessing a server or the like via a network or read out such an action profile by accessing a recording medium (not shown), for example. The action profile may be, for example, information that associates actions of the robot 2 and specific ways in which a plurality of rotation shafts rotate when the actions are to be performed, with each other. The actions of the robot 2 are, for example, forward travel, rearward travel, a turn to the right, a turn to the left, and so on that are performed by the robot 2, or other actions of the robot 2 (e.g. raise its right hand, raise its left hand, and so on). Specific ways in which a plurality of rotation shafts rotate when an action is to be performed may be indicated by information regarding details of control that is to be performed on the rotation shafts, including the amount of rotation regarding the plurality of rotation shafts, and the respective rotation sequences of the rotation shafts, for example. Note that the rotation shafts are driven by motors, and therefore the action profile may be regarded as information indicating details of controls that is to be performed on the motors. For example, if the robot 2 is a humanoid robot or an animal robot, it is necessary to perform complex rotation control on a plurality of rotation shafts to enable the robot 2 to simply travel forward. Therefore, details of control that is performed on the plurality of rotation shafts in relation to forward travel, details of control that is performed on the plurality of rotation shafts in relation to rearward travel, details of control that is performed on the plurality of rotation shafts in relation to a turn to the right, and details of control that is performed on the plurality of rotation shafts in relation to a turn to the left may have been set in advance for each type of the robot 2 as action profiles, and the profile acquiring unit 15 may acquire action profiles corresponding to the type of the robot 2 determined by the determination unit 14, from among the action profiles that have been set. Also, the motor control unit 11 may control the plurality of motors using the action profiles acquired by the profile acquiring unit 15. For example, when causing the robot 2 to travel forward using an action profile that has been acquired, the motor control unit 11 may control the rotation shafts according to an action profile corresponding to forward travel, and when causing the robot 2 to turn to the right using an action profile that has been acquired, the motor control unit 11 may control the rotation shafts according to an action profile corresponding to a turn to the right. Note that, if the determination unit 14 determines the type of a robot 2 that does not indicates the number of shafts included in a link row, such as "a humanoid robot" or "an animal robot", the number of shafts included in a link row indicated by an action profile may differ from the number of shafts included in a link row of the robot 2. In such a case, a link row indicated by an action profile may be used after being converted to a link row of the actual robot 2, using a link row mapping method disclosed in JP Patent No. 5892531, for example. The profile acquiring unit 15 may accumulate the acquired action profiles in the storage unit 16. This is in order to enable the motor control unit 11 to use the action profiles to operate.

The storage unit 16 may store information such as action profiles. Also, information indicating the positional relationship between rotation shafts, which has been acquired by the positional relationship acquiring unit 13, for example, may be stored in the storage unit 16. The process through which information is stored in the storage unit 16 is not limited. For example, information may be stored in the storage unit 16 via a recording medium, information transmitted through a communication network or the like may be stored in the storage unit 16, or information input via an input device may be stored in the storage unit 16. Note that the action profiles may be accumulated in the storage unit 16 by the profile acquiring unit 15, for example. Storage in the storage unit 16 may be temporal storage using a RAM or the like, or long-term storage. The storage unit 16 can be realized using a specific recording medium (e.g. a semiconductor memory or a magnetic disk).

The inertia moment calculation unit 17 uses the torque of a rotation shaft when the rotation shaft is rotated by the motor control unit 11, and an angular velocity that has been acquired by the angular velocity sensor of a link row on the leading end side of the rotation shaft, to calculate, for the rotation shaft, the moment of inertia regarding a link row on the leading end side of the rotation shaft. Here, the relationship among a torque T, a moment of inertia J, and an angular acceleration α can be expressed by the following formula.

$$T = J \times \alpha$$

The inertia moment calculation unit 17 can acquire the angular acceleration a by differentiating the angular velocity acquired by the angular velocity sensor, with respect to time. If a motor with known characteristics is used, the inertia moment calculation unit 17 can acquire the torque T of the motor by obtaining a current applied by the motor control unit 11 to the motor, using a relationship between a current applied to the motor and the torque of the motor corresponding to the current. Therefore, the inertia moment calculation unit 17 can calculate the moment of inertia J (=T/α) by using the torque T and the angular acceleration α. Note that the inertia moment calculation unit 17 may calculate the moment of inertia J for each rotation shaft. Also, the moment of inertia J may be the moment of inertia of a link row on the leading end side of a joint shaft. Note that, if the inertia moment calculation unit 17 calculates the moment of inertia J for each rotation shaft, the motor control unit 11 may control the plurality of motors using the moments of inertia calculated by the inertia moment calculation unit 17. Controlling the motors using the moments of inertia may mean using the moments of inertia to perform feedback control such as PID (Proportional Integral Differential) control to operate the robot 2. Note that a link row for which the moment of inertia can be calculated is typically a link row whose leading end is a free end. Therefore, the inertia moment calculation unit 17 may perform processing to calculate the moment of inertia for only link rows whose leading ends are free ends.

Next, operations of the positional relationship acquiring apparatus 1 will be described with reference to the flowchart shown in FIG. 2.

Step S101: The motor control unit 11 rotates a rotation shaft while fixing the other rotation shafts (i.e. without rotating the other rotation shafts).

Step S102: The receiving unit 12 receives angular velocities respectively from angular velocity sensors that are provided for the other rotation shafts, when the rotation shaft is rotated. Note that steps S101 and S102 are typically performed at the same time. That is to say, the angular velocities are received by the receiving unit 12 while a rotation shaft is rotated by the motor control unit 11. The angular velocities received by the receiving unit 12 may be stored in a recording medium (not shown). An angular velocity thus stored is, for example, an angular velocity at a given point in time, information indicating temporal changes in the angular velocity, or the maximum absolute value of the angular velocity.

Step S103: The positional relationship acquiring unit 13 determines whether or not the processing in steps S101 and S102 has been performed on every rotation shaft. If the processing has been performed on every rotation shaft, processing proceeds to step S104, and otherwise processing returns to step S101 so that rotation shafts that have not been rotated are rotated.

Step S104: The positional relationship acquiring unit 13 classifies, for each rotation-target rotation shaft, the other rotation shafts into two groups. For this classification, the angular velocities of the other rotation shafts, acquired when the rotation-target rotation shaft was rotated, are used. That is to say, this processing can be regarded as being the same as classifying, for each rotation-target rotation shaft, the angular velocities of the other rotation shafts. The details of this processing will be described later.

Step S105: The positional relationship acquiring unit 13 specifies rotation shafts at the leading ends of link rows, using the result of step S104. Specifying rotation shafts may mean, for example, accumulating the identifiers of the rotation shafts. If the target that is to be specified is the rotation shaft at a leading end, the identifier of the rotation shaft may be accumulated in association with information indicating that the rotation shaft is at a leading end, for example.

Step S106: The positional relationship acquiring unit 13 specifies a rotation shaft that is connected to the base end side of a link row that includes one or more rotation shafts specified in step S105 or steps S105 and S106. As a result of this specification, the number of rotation shafts included in the link row that has been specified is extended by one. Therefore, as a result of such specification being repeatedly performed, the entire link row is specified, for example. Note that it may be impossible to specify a single rotation shaft in step S106. In such a case, processing may proceed to S107 without specifying a rotation shaft.

Step S107: The positional relationship acquiring unit 13 determines whether or not to stop specifying a rotation shaft that is connected to a rotation shaft on the leading end-side. If it is determined to stop, processing proceeds to step S108, and otherwise processing returns to step S106. Note that, if the rotation shaft ultimately specified in step S106 is a rotation shaft at a leading end, or if it was unable to specify a single rotation shaft in step S106 (i.e. the link relationship includes branches), the positional relationship acquiring unit 13 may determine to stop specifying a rotation shaft.

Step S108: The positional relationship acquiring unit 13 determines whether or not there is a rotation shaft that has not been subjected to specifying processing in step S106, in the rotation shafts at leading ends specified in step S105. If there is such a rotation shaft, processing returns to step S106, and the rotation shaft is subjected to the processing in step S106. Otherwise, processing proceeds to step S109.

Step S109: The positional relationship acquiring unit 13 acquires a connection relationship between the base ends of the link rows specified in steps S105 to S108. Thus, link rows that each indicate the arrangement of rotation shafts, and connection relationship between the base ends of the link rows are acquired, and thus the positional relationship between all the rotation shafts of the robot 2 is acquired. Such positional relationships may be accumulated in a recording medium (not shown).

Step S110: The positional relationship acquiring unit 13 determines whether a rotation shaft at a leading end is a free end or a grounded end. Such results of determination may be accumulated in a recording medium (not shown).

Step S111: The positional relationship acquiring unit 13 acquires a relative angle between rotation shafts that are adjacent to each other. Such relative angles may be accumulated in a recording medium (not shown).

Step S112: The determination unit 14 determines the type of the robot 2, using, for example, the positional relationship acquired by the positional relationship acquiring unit 13. The result of determination may be accumulated in a recording medium (not shown).

Step S113: the profile acquiring unit 15 acquires an action profile that is to be used to enable the robot 2 to perform an action, using the type of the robot 2 determined by the determination unit 14. Such action profiles thus acquired may be accumulated in the storage unit 16. The action profiles may be used by the motor control unit 11 to perform control.

Step S114: The inertia moment calculation unit 17 calculates the moment of inertia J for each rotation shaft. Note that, if information indicating temporal changes in the angular velocity has been stored in step S102, the inertia moment calculation unit 17 can use the information to calculate an angular acceleration. On the other hand, if such information is not stored, the inertia moment calculation unit 17 may rotate each rotation shaft to calculate the moments of inertia J, and calculate the angular acceleration using temporal changes in the angular velocity that are acquired accordingly. The moments of inertia J calculated by the inertia moment calculation unit 17 may be accumulated in a recording medium (not shown), and used by the motor control unit 11 to perform control. Note that the inertia moment calculation unit 17 may calculate the moment of inertia for only link rows whose leading ends are free ends, for example.

Figure 2:
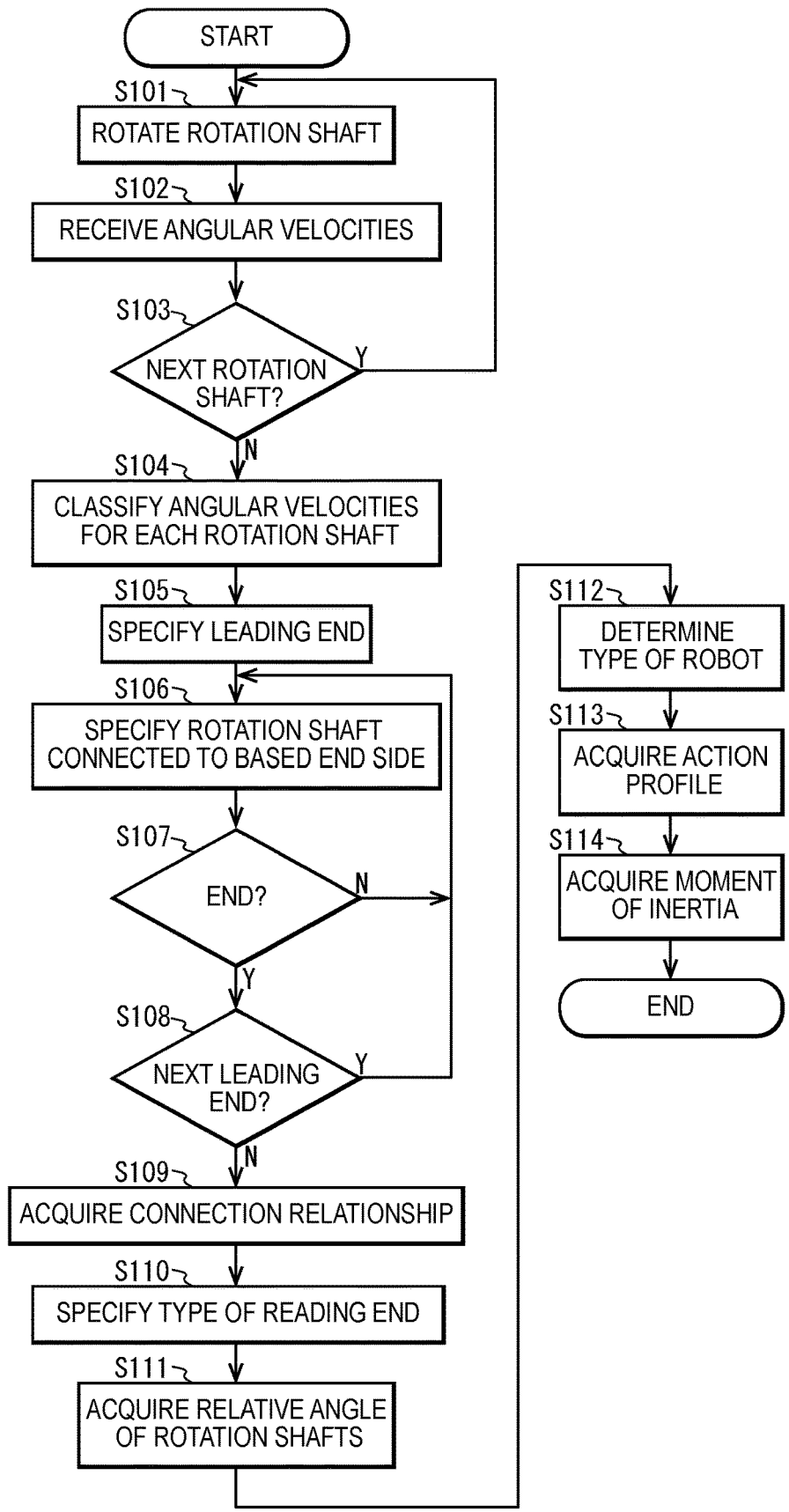
FIG. 2 is a flowchart showing operations of a positional relationship acquiring apparatus according to the embodiment.

Although the flowchart shown in FIG. 2 illustrates a case where all the rotation shafts are rotated, the present invention is not limited to such a case. For example, if rotation shafts for which a positional relationship is to be acquired are limited, only such rotation shafts may be rotated. Also, at the acquisition, in step S111, of the relative angle between rotation shafts that are adjacent to each other, the positional relationship acquiring unit 13 may control the motor control unit 11 to rotate one of the rotation shafts that are adjacent to each other, and acquire a relative angle using the angular velocity received by the receiving unit 11 in response to the rotation. Also, the order in which the processing in FIG. 2 is performed is an example, and the order of the steps may be changed only if the same result can be obtained. In the flowchart in FIG. 2, processing ends upon power off or an interruption for processing exit.

Next, a specific method through which the positional relationship acquiring unit 13 acquires the positional relationship between rotation shafts will be described. In this example, the robot 2 has twelve rotation shafts (joints) P0 to P11 shown in FIG. 5. Thereafter, the positional relationship acquiring unit 13 rotates each rotation shaft in order from the rotation shaft P0 (steps S101 to S103), and, based on the angular velocities of the other rotation shafts accordingly received, classifies the other rotation shafts into rotation shafts with an angular velocity of a large absolute value and rotation shafts with an angular velocity of a small absolute value (step S104). For example, if the rotation shaft P0 is rotated, the degree of rotation of rotation shafts on the body side, such as the rotation shaft P3, is smaller than the degree of rotation of the rotation shafts P1 and P2 on the hand side in the link row of the arm. Therefore, the positional relationship acquiring unit 13 classifies the rotation shafts into one or two groups as shown in FIG. 6, according to the absolute values of the angular velocities acquired by the angular velocity sensors. Note that, in the first record in FIG. 6, the rotation shafts P1 and P2 are classified as rotation shafts with a high angular velocity, and the rotation shafts P3 to P11 are classified as rotation shafts with a low angular velocity. In this record, the angular velocities of the rotation shafts that are classified into the same group, specifically, the angular velocities corresponding to the rotation shafts P1 and P2, and the angular velocities corresponding to the rotation shafts P3 to P11, are typically the same in terms of falling within the range of tolerance. Also, as described above, the maximum value of the absolute values of the received angular velocities may be used as the angular velocity of them. It is assumed that, in a case where the rotation target is the rotation shaft P2, the angular velocities of all of the rotation shafts P0, P1, and P3 to P11 are lower than a predetermined threshold value. If this is the case, as shown in FIG. 6, the positional relationship acquiring unit 13 registers the rotation shafts P0, P1, and P3 to P11 as rotation shafts with an angular velocity of a small absolute value. On the other hand, it is assumed that, in a case where the rotation target is the rotation shaft P5, the angular velocities of all of the rotation shafts P0 to P4 and P6 to P11 are higher than the predetermined threshold value. If this is the case, as shown in FIG. 6, the positional relationship acquiring unit 13 registers the rotation shafts P0 to P4 and P6 to P11 as rotation shafts with an angular velocity of a large absolute value. In this way, each rotation shaft is rotated, and accordingly the positional relationship acquiring unit 13 acquires, for each rotation-target rotation shaft, the result of classification of the other rotation shafts into two groups.

Next, the positional relationship acquiring unit 13 specifies a rotation shaft at a leading end, using the result of classification into groups shown in FIG. 6 (step S105). Specifically, in FIG. 6, if there is a group that does not include a rotation shaft, the positional relationship acquiring unit 13 may determine the rotation-target rotation shaft of the record that includes the group as a rotation shaft at a leading end. Also, in FIG. 6, if there is a group that includes only one rotation shaft, the positional relationship acquiring unit 13 may determine the one rotation shaft as a rotation shaft at a leading end. Therefore, the positional relationship acquiring unit 13 can specify the rotation shafts P2, P5, P8, and P11 as rotation shafts at leading ends. Thereafter, the positional relationship acquiring unit 13 specifies a rotation shaft that is adjacent to the specified rotation shaft at a leading end, one after the other (steps S106 to S108). Specifically, in FIG. 6, if there is a group that only includes a rotation shaft at a leading end, the positional relationship acquiring unit 13 may regard the rotation-target rotation shaft in the record that includes the group as a rotation shaft that is adjacent to the rotation shaft at the leading end. Therefore, the positional relationship acquiring unit 13 can reference the record in which the rotation target is the rotation shaft P1, and determine that the rotation shaft P1 is adjacent to the rotation shaft P2. Thereafter, in FIG. 6, if there is a group that only includes the specified link row on the leading end side, the positional relationship acquiring unit 13 may determine the rotation-target rotation shaft in the record that includes the group, as the rotation shaft that is adjacent to the link row on the leading end side. Therefore, the positional relationship acquiring unit 13 can reference the record in which the rotation target is the rotation shaft P0, and determine that the rotation shaft P0 is adjacent to the link row P1-P2 (this notation indicates that the rotation shaft at the right end is the rotation shaft at the leading end). Note that, in FIG. 6, if there is no group that only includes the specified link row on the leading end side, the positional relationship acquiring unit 13 may stop specifying a rotation shaft that is connected to the link row. For example, in FIG. 6, there is no group that only includes a link row P0-P1-P2, and therefore positional relationship acquiring unit 13 determines that there is not a single rotation shaft that is connected to the base end side of the link row P0-P1-P2, i.e. determines that the rotation shaft P0 is the rotation shaft at the base end, and stops specifying a rotation shaft regarding the link row. In this case, there is a branch on the base end side of the rotation shaft P0. By repeating such processing, the positional relationship acquiring unit 13 can specify four link rows P0-P1-P2, P3-P4-P5, P6-P7-P8, and P9-P10-P11.

Thereafter, the positional relationship acquiring unit 13 acquires a connection relationship between the rotation shafts at the base ends of the four link rows (step S109). Specifically, in FIG. 6, if there is a group that includes all of the rotation shafts in a link row P0-P1-P2, the positional relationship acquiring unit 13 determines the rotation-target rotation shaft in the record that includes the group as a candidate rotation shaft that is possibly connected to the rotation shaft P0 at the base end of the link row P0-P1-P2. For example, positional relationship acquiring unit 13 determines the rotation shafts P3 to P11 as candidate rotation shafts that are possibly connected to the rotation shaft P0. Also, the positional relationship acquiring unit 13 ultimately determines, from among the rotation shaft candidates that are possibly connected to the rotation shaft at the base end, a rotation shaft at the base end of a link row, as the rotation shaft that is connected to the rotation shaft at the base end. For example, the positional relationship acquiring unit 13 determines, from among the rotation shaft candidates P3 to P11 that are possibly connected to the rotation shaft P0, the rotation shafts P3, P6, and P9 at the base ends of link rows, as the rotation shafts that are connected to the rotation shaft P0. The positional relationship acquiring unit 13 performs this processing on each link row. In this way, for example, the positional relationship acquiring unit 13 can acquire a connection relationship in which the rotation shafts P0, P3, P6, and P9 at base ends are connected to each other. Thus, the ultimate positional relationship between the rotation shafts of the robot 2 is acquired.

Also, the positional relationship acquiring unit 13 determines whether a rotation shaft at the leading end of each link row is a free end or a grounded end (step S110). In FIG. 6, if an empty group that is included in a record in which a rotation shaft at the leading end of a link row is the rotation target is a group of rotation shafts with a high angular velocity, the positional relationship acquiring unit 13 determines that the rotation shaft at the leading end as a free end, and if the empty group is a group of rotation shafts with a low angular velocity, the positional relationship acquiring unit 13 determines that the rotation shaft at the leading end as a grounded end. Therefore, the positional relationship acquiring unit 13 determines the rotation shafts P2 and P8 as free ends, and the rotation shafts P5 and P11 as grounded ends.

Note that the positional relationship acquiring unit 13 may acquire the positional relationship between rotation shafts as shown in FIGS. 7A and 7B. FIG. 7A shows the positional relationship between the rotation shafts in the link row P0-P1-P2, and FIG. 7B shows the positional relationship between the rotation shafts in the link row P3-P4-P5. FIGS. 7A and 7B show, for each rotation shaft, a first end-side rotation shaft and a second end-side a rotation shaft that are adjacent to the rotation shaft. FIGS. 7A and 7B show a case where the first end is a leading end and the second end is a base end. Specifically, the first record in FIG. 7A indicates that there is no leading end-side rotation shaft that is adjacent to the rotation shaft P2, and this rotation shaft P2 is a free end, and the base end-side rotation shaft that is adjacent to the rotation shaft P2 is the rotation shaft P1. The second record in FIG. 7A indicates that the leading end-side rotation shaft that is adjacent to the rotation shaft P1 is the rotation shaft P2, and the base end-side rotation shaft that is adjacent to the rotation shaft P1 is the rotation shaft P0. The third record in FIG. 7A indicates that the leading end-side rotation shaft that is adjacent to the rotation shaft P0 is the rotation shaft P1, and the base end-side rotation shafts that are adjacent to the rotation shaft P0 are the rotation shafts P3, P6, and P9, i.e. the rotation shaft P0 is the rotation shaft at the base end. It is also shown that the base end-side rotation shafts that are adjacent to the rotation shaft P0 are the rotation shafts P3, P6, and P9, and thus a connection relationship between link rows is also shown. The same applies to FIG. 7B. Note that FIGS. 7A and 7B are redundant because the adjacent rotation shafts on the leading end side and the base end side are shown for each rotation shaft in a link row. Therefore, in order to remove such redundancy, for example, for each rotation shaft of a link row, only the first end-side (leading end-side) rotation shaft or the second end-side (base end-side) rotation shaft that is adjacent to the rotation shaft may be shown. Even in such a case, it is preferable that rotation shafts at ends of a link row are specified as a free end, a grounded end, or a base end. FIG. 7C shows information indicating the positional relationship between rotation shafts of a link row whose both ends are free ends, such as that of a snake robot. As shown in FIG. 7C, if both ends are free ends, or both ends are grounded ends, neither the first end nor the second end is a base end.

Also, using the angular velocities received in step S102, the positional relationship acquiring unit 13 acquires the respective relative angles of the rotation-target rotation shaft and the rotation shaft that is adjacent thereto (step S111). Note that a rotation shaft that is adjacent to a given rotation shaft can be specified by using the positional relationship between the rotation shafts acquired as described above.

Figure 5:
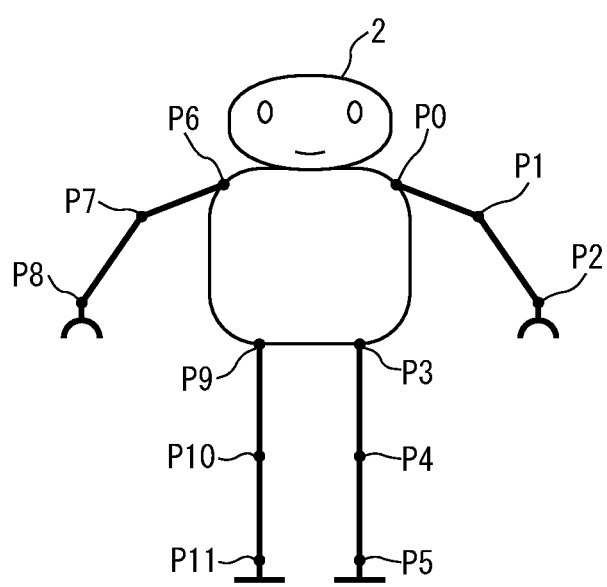
FIG. 5 is a diagram showing joints of a robot according to the embodiment.

Thereafter, using the positional relationship between the rotation shafts acquired by the positional relationship acquiring unit 13, and information that associates positional relationships between rotation shafts and the types of robots, the determination unit 14 determines the type of the robot 2 shown in FIG. 5 as a humanoid robot (step S112). Such determination may be performed using, for example, the types of link rows as described above.

Using the result of determination performed by the determination unit 14, the profile acquiring unit 15 acquires action profiles corresponding to the humanoid robot, which is the type of the robot 2 and is the result of determination, from a server (not shown), and accumulates them in the storage unit 16 (step S113). The inertia moment calculation unit 17 calculates the moment of inertia of each of the rotation shafts included in the link rows at the free ends by using information that indicates temporal changes in the angular velocity received in step S102, or by using temporal changes in the angular velocity received by the receiving unit 12 in response to each rotation shaft being rotated by the motor control unit 11 (step S114). Such moment of inertia may be set to the motor control unit 11 so as to be used in PID control or the like.

As described above, with the positional relationship acquiring apparatus 1 according to the present embodiment, it is possible to automatically acquire the positional relationship between rotation shafts. Therefore, the user need not manually set such positional relationship, which improves user convenience. Also, if a user manually sets a positional relationship, such a positional relationship can be incorrect. However, by using the positional relationship acquiring apparatus 1 to acquire the positional relationship, it is possible to reduce the likelihood of such incorrect setting happening.

Although the present embodiment describes a case where the moment of inertia is calculated, the present invention is not limited to such a case. If the moment of inertia is not to be calculated, the positional relationship acquiring apparatus 1 need not include the inertia moment calculation unit 17.

Although the present embodiment describes a case where action profiles corresponding to the type of the robot 2 are acquired, the present invention is not limited to such a case. If action profiles are not to be acquired, the positional relationship acquiring apparatus 1 need not include the profile acquiring unit 15. If action profiles are not to be acquired, the motor control unit 11 may use, for example, inverse kinematics to calculate the angle of each rotation shaft corresponding to the position of the leading end of a link row, and control each rotation shaft according to the angle thus calculated. If this is the case, for example, the length between rotation shafts may be determined in advance. Specifically, the link rows of the robot 2 may be formed by coupling links that each have a predetermined length to each other.

Although the present embodiment describes a case where, when a rotation shaft is rotated, a rotation shaft on one side and a rotation shaft on the other side with respect to the rotation shaft have different angular velocities, there is the possibility of the rotation shafts on both sides having the same angular velocity by accident. For example, in FIG. 4, if the rotation shaft P103 is rotated and the other rotation shafts are not rotated, it is possible that the angular velocities acquired from the rotation shafts satisfy $\omega 1 = \omega 2$. In such a case, if the positional relationship between the rotation shafts is acquired as described above, the rotation shaft P103 is determined as a rotation shaft at an end, and an inappropriate positional relationship is acquired. Therefore, as with the case of the record in which the rotation-target rotation shafts are rotation shafts P2, P5, P8, and P11 in FIG. 6, if one of the groups does not include a rotation shaft, whether or not the rotation-target rotation shaft is a rotation shaft at an end may be checked. Such a check may be performed according to (1) or (2) below, for example.

(1) A Check Method Performed by Rotating a Rotation Shaft

In this case, if a rotation-target rotation shaft is provisionally determined as a rotation shaft at an end, the angles of all or some of the rotation shafts other than the rotation target are slightly changed, thereafter the rotation-target rotation shaft is rotated again, and the angular velocities of the rotation shafts are measured. At the follow-up measurement, if one of the groups does not include a rotation shaft as with the first measurement, the rotation-target rotation shaft may be ultimately determined as a rotation shaft at an end. Note that the follow-up measurement of angular velocities may be performed a plurality of times while changing the extent to which the angles of the rotation shafts other than the rotation target are changed. If one of the groups does not include a rotation shaft at every measurement, the rotation-target rotation shaft may be determined as a rotation shaft at an end. As a result of a follow-up measurement, if both groups include a rotation shaft, it is possible to appropriately acquire the positional relationship between the rotation shafts in the link rows, using rotation shafts included in a group of rotation shafts of which the acquired angular velocities are low and rotation shafts included in a group of rotation shafts of which the acquired angular velocities are high.

(2) A Check Method Performed Using an Adjacency Relationship Between the Rotation Shafts When a rotation shaft is rotated, if the angular velocities acquired from the rotation shafts on both sides are accidentally the same, it is determined that the rotation-target rotation shaft is at an end, and there is no rotation shaft that is adjacent to the rotation shaft. Specifically, in FIG. 4, although the rotation-target rotation shaft P103 is not a rotation shaft at an end, $\omega 1=\omega 2$ is satisfied, and when the rotation shaft P103 is rotated, in a case where no rotation shaft is included in a group with a low angular velocity, even if the other rotation shafts are rotated, there is no rotation shaft with which only the rotation shaft P103 is included in one of the groups (the group of rotation shafts with a low angular velocity or the group of rotation shafts with a high angular velocity). Therefore, this fact shows that the rotation shaft P103 is not a rotation shaft at an end. In this way, if it has been found that the rotation-target rotation shaft P103 is not a rotation shaft at an end, the positional relationship between the rotation shafts other than the rotation shaft (i.e. the adjacency relationship between the rotation shafts in the link row) may be specified, and the adjacency relationship regarding the rotation shaft P103 may be specified using the positional relationship thus specified. Specifically, the adjacency relationship regarding the rotation shaft P103 may be acquired in the following manner. If the rotation shaft P103 is the rotation target and $\omega 1=\omega 2$ is satisfied, it is likely that both ends of a link row that includes the rotation shaft P103 are free ends. Therefore, a link row P102-P101 and a link row P104-P105 other than the rotation shaft P103 can be specified. If the rotation shaft P103 is the rotation target, the rotation shafts from which the angular velocities have been acquired are the rotation shaft P101, P102, P104, and P105, and this fact does not exclude the possibility of the rotation shaft P103 being present between the rotation shaft P102 on the base end side of the link row P102-P101 and the rotation shaft P104 on the base end side of the of the link row P104-P105. Therefore, in this case, a link row P101-P102-P103-P104-P105 may be specified. More specifically, if a plurality of rotation shafts acquired when a given target is the rotation target match a plurality of rotation shafts specified in order from the leading end side of each of two link rows, the positional relationship acquiring unit 13 may determine that the rotation-target rotation shaft is present between the rotation shafts on the base end side of the two link rows.

Although the present embodiment describes a case where the type of the robot 2 is determined, the present invention is not limited to such a case. If the type of the robot 2 is not determined, the positional relationship acquiring apparatus 1 need not include the determination unit 14.

Although the present embodiment describes a case where the positional relationship acquiring unit 13 acquires a relative angle between two rotation shafts that are adjacent to each other, the present invention is not limited to such a case. Although the present embodiment describes a case where the positional relationship acquiring unit 13 determines whether a rotation shaft at the leading end of a link row is a free end or a grounded end, the present invention is not limited to such a case.

Even if the positional relationship acquiring apparatus 1 according to the present embodiment can acquire the order in which rotation shafts are arranged in each link row or information regarding whether a leading end side of each link row is a free end or a grounded end, there is the possibility that the positional relationship between a plurality of link rows cannot be determined. For example, in a case where the robot 2 is a humanoid robot, even if whether each link row is an arm or a leg can be discerned, there is the possibility that whether an arm is the right arm or the left arm cannot be discerned. In such a case, whether a link row is the right arm or the left arm may be manually set by actually moving the arms of the robot 2. Even in such a case, it is possible to automatically acquire the order in which rotation shafts in a link row are arranged. Therefore, compared to a case where such setting is manually performed by the user, it is possible to improve user convenience, and reduce the likelihood of incorrect setting happening.

Although the above embodiment describes a case where the positional relationship acquiring apparatus is stand-alone, the positional relationship acquiring apparatus may be a stand-alone apparatus or a server apparatus in a server-client system. In the latter case, the output unit and the receiving unit may receive input information or output information via a communication network.

In the above embodiment, each kind of processing or each function may be realized as centralized processing that is performed by a single device or a single system, or distributed processing that is performed by a plurality of devices or a plurality of systems.

In the above embodiment, for example, if two constituent elements that exchange information are physically different elements, such exchange of information between the two constituent elements may be performed by one constituent element outputting information and the other constituent element receiving the information. Alternatively, if two constituent elements that exchange information are physically the same elements, such exchange of information may be performed through transition from a processing phase corresponding to one constituent element to a processing phase corresponding to the other constituent element.

In the above embodiment, pieces of information related to processing performed by the constituent elements, such as pieces of information accepted, acquired, selected, generated, transmitted, or received by the constituent elements, and pieces of information such as threshold values, formulas, and addresses, may be held in a recording medium (not shown) temporarily or for a long term even if such a fact is not explicitly described above. Accumulation of pieces of information in such a recording medium (not shown) may be performed by any of the constituent elements or an accumulation unit (not shown). Reading out of pieces of information from such a recording medium (not shown) may be performed by any of the constituent elements or a readout unit (not shown).

In the above embodiment, if pieces of information used by the constituent elements and so on, such as threshold values and addresses used by the constituent elements to perform processing and various kinds of setting values can be changed by users, users may or may not change such pieces of information as appropriate even if such a fact is not explicitly described above. If users are allowed to change such pieces of information, such change may be realized by a receiving unit (not shown) that receives a change instruction from a user, and a changing unit (not shown) that change a piece of information according to the change instruction. Such a change instruction may be received by the receiving unit (not shown) from an input device, for example. Also, information transmitted via a communication network, or information read out from a predetermined recording medium may be received.

In the above embodiment, if two or more constituent elements included in the positional relationship acquiring apparatus include a communication device or an input device, the two or more constituent elements may share a physically single device, or separate devices.

In the above embodiment, each constituent element may be constituted by dedicated hardware, and constituent elements that can be realized using software may be realized by executing a program. For example, each constituent element can be realized by a program execution unit such as a CPU reading out and executing a software program recorded in a recording medium such as a hard disk or a semiconductor memory. The program execution unit may execute a program while accessing the storage unit or the recording medium. Note that software that realizes the positional relationship acquiring apparatus according to the above embodiment is a program as described below. That is, the program is for causing a computer to execute: a motor control step of controlling a plurality of motors of a robot that has a plurality of rotation shafts that are respectively driven by the plurality of motors, thereby rotating the plurality of rotation shafts one by one; a receiving step of, when the plurality of rotation shafts are rotated one by one in the motor control step, receiving angular velocities that have been acquired by a plurality of angular velocity sensors that are respectively provided for the plurality of rotation shafts; and a positional relationship acquiring step of acquiring a positional relationship between the plurality of rotation shafts, using the angular velocities that have been acquired by the plurality of angular velocity sensors when the plurality of rotation have been rotated one by one.

Note that functions realized by the above-described program do not include a function that can only be realized by hardware. For example, functions that can only be realized by hardware such as a modem or an interface card in an acquiring step of acquiring information, a receiving step of receiving information, an output step of outputting information, and so on are at least not included in the functions realized by the above-described program.

This program may be downloaded from a server or the like and executed, or recorded on a predetermined recording medium (e.g. an optical disc such as a CD-ROM, a magnetic disk, or a semiconductor memory) and read out and executed. This program may also be used as a program that constitutes a program product.

A single computer or a plurality of computers may execute this program. That is to say, centralized processing or distributed processing may be performed.

Figure 8:
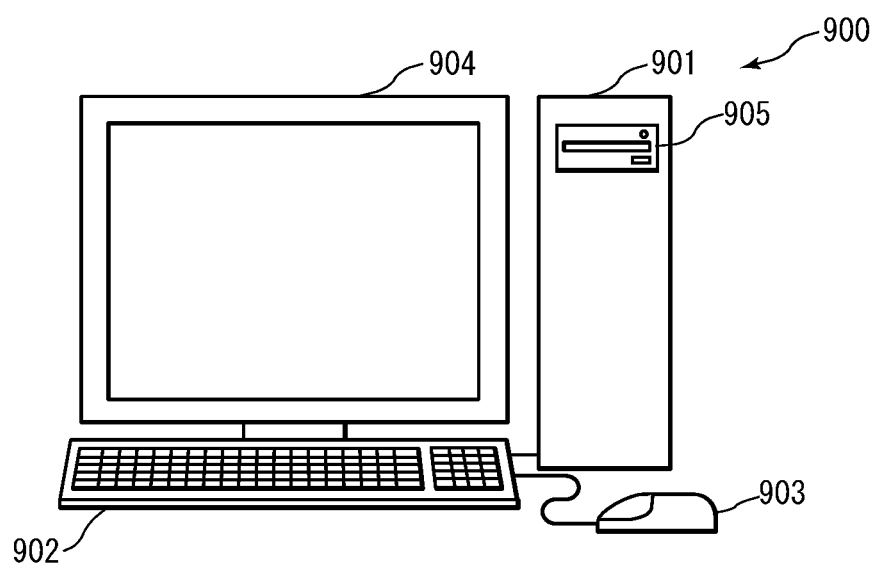
FIG. 8 is a schematic diagram showing an example of an external appearance of a computer system according to the embodiment.

FIG. 8 is a schematic diagram showing an example of an external appearance of a computer that executes the above-described program and realizes the positional relationship acquiring apparatus 1 according to the above-described embodiment. The above-described embodiment may be realized using computer hardware and a computer program that is executed therein.

In FIG. 8, a computer system 900 includes a computer 901 that includes a CD-ROM drive 905, a keyboard 902, a mouse 903, and a monitor 904.

Figure 9:
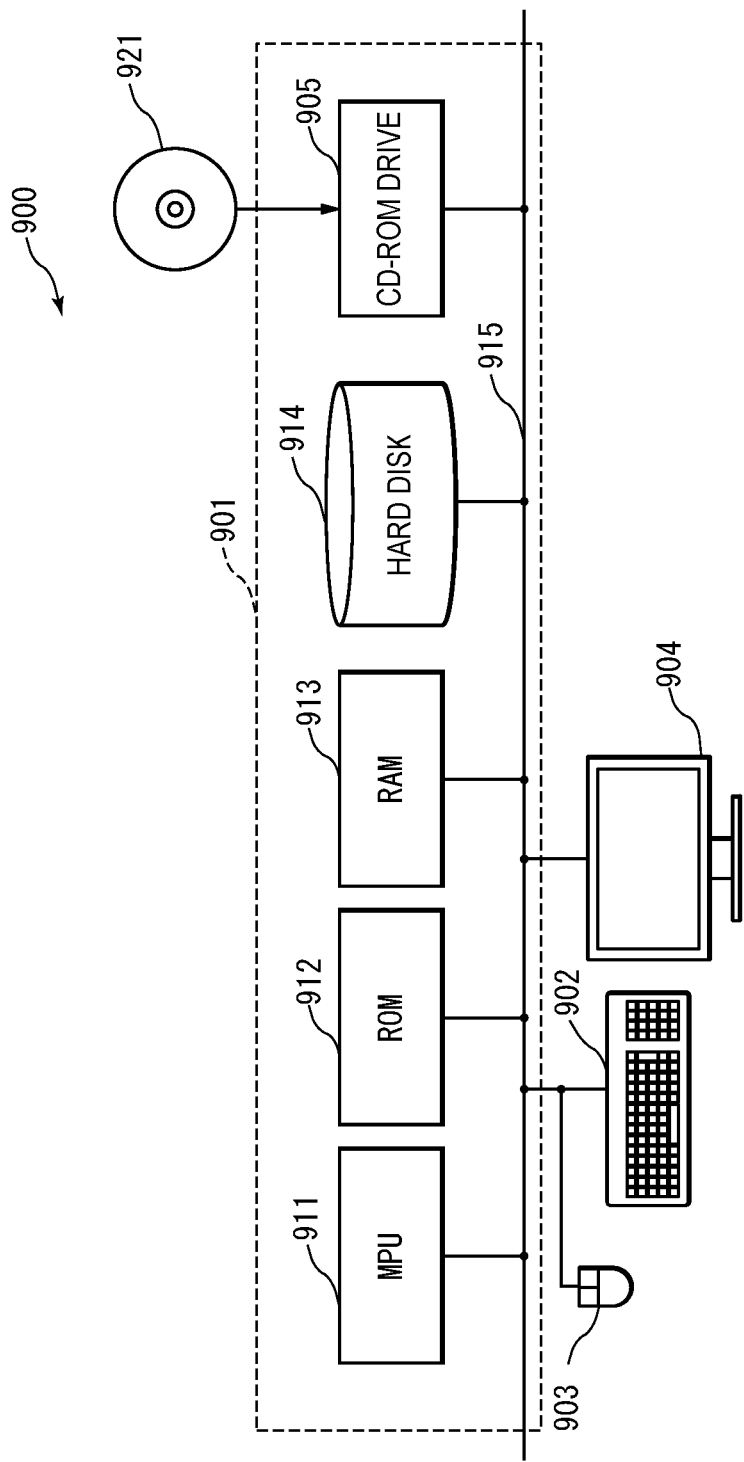
FIG. 9 is a schematic diagram showing an example of a configuration of the computer system according to the embodiment.

FIG. 9 is a diagram showing an internal configuration of the computer system 900. In FIG. 9, the computer 901 includes, in addition to the CD-ROM drive 905, an MPU (Micro Processing Unit) 911, a ROM 912 for storing programs such as a bootup program, a RAM 913 that is connected to the MPU 911, temporarily stores an instruction from an application program, and provides temporary storage space, a hard disk 914 that stores an application program, a system program and data, and a bus 915 that connects MPU 911, the ROM 912, and so on to each other. Note that the computer 901 may include a network card (not shown) that provides connection to a LAN, a WAN, and so on.

The program that causes the computer system 900 to execute the functions of the positional relationship acquiring apparatus 1 according to the above-described embodiment may be stored in the CD-ROM 921, inserted into the CD-ROM drive 905, and transferred to the hard disk 914. Instead, the program may be transmitted to the computer 901 via a network (not shown) and stored in the hard disk 914. The program is loaded to the RAM 913 when it is to be executed. Note that the program may be loaded directly from the CD-ROM 921 or a network. The program may be read into the computer system 900 via another recording medium (e.g. a DVD) instead of the CD-ROM 921.

The program does not necessarily include an operating system (OS) that causes the computer 901 to execute the functions of the positional relationship acquiring apparatus 1 according to the above-described embodiment, a third-party program, or the like. The program may only include an instruction portion that calls an appropriate function or module in a controlled mode so that a desired result can be achieved. How the computer system 900 operates is well known, and a detailed description thereof is omitted.

The present invention is not limited to the above embodiment and may be variously modified. As a matter of course, such modifications are also included in the scope of the present invention.

As described above, with the positional relationship acquiring apparatus and so on according to the present invention, it is possible to achieve the effect in that the positional relationship between a plurality of rotation shafts that are driven by a plurality of motors can be acquired without the user manually performing setting or the like. Thus, the positional relationship acquiring apparatus and so on are useful as an apparatus and so on for acquiring the positional relationship between the rotation shafts of a robot.

The invention claimed is:

1. A positional relationship acquiring apparatus comprising:
   a motor control unit that controls a plurality of motors of a robot that has a plurality of rotation shafts that are respectively driven by the plurality of motors;
   a receiving unit that receives angular velocities that have been acquired by a plurality of angular velocity sensors that are respectively provided for the plurality of rotation shafts; and
   a positional relationship acquiring unit that acquires a positional relationship between the plurality of rotation shafts, using the angular velocities acquired by the plurality of angular velocity sensors and received by the receiving unit when the plurality of rotation shafts
have been rotated by the motor control unit one by one,
wherein the robot has a link row that includes a plurality
of links that are coupled to each other by a plurality of
joints that respectively correspond to the plurality of
rotation shafts,
the positional relationship is a positional relationship
between the rotation shafts in the link row, and
the positional relationship acquiring unit is configured to:
rotate a particular rotation shaft;
classify other rotation shafts into a first group having a
first angular velocity and a second group having a
second angular velocity; and
determine that a position of the particular rotation shaft
is located between the first group of rotation shafts
and the second group of rotation shafts.

2. The positional relationship acquiring apparatus according to claim 1,
wherein, when a rotation shaft at the leading end of the
link row is rotated, if angular velocities acquired by
angular velocity sensors provided for the other rotation
shafts are lower than a threshold value, the positional
relationship acquiring unit determines that the leading
end is a free end, and if the angular velocities are higher
than the threshold value, the positional relationship
acquiring unit determines that the leading end is a
grounded end.

3. The positional relationship acquiring apparatus according to claim 1, further comprising:
a determination unit that determines the type of the robot,
using the positional relationship between the rotation
shafts, acquired by the positional relationship acquiring
unit.

4. A robot system comprising:
a robot that has the plurality of angular velocity sensors,
the plurality of motors, and the plurality of rotation
shafts that are respectively rotated by the plurality of
motors; and
a positional relationship acquiring apparatus comprising:
a motor control unit that controls a plurality of motors of
a robot that has a plurality of rotation shafts that are
respectively driven by the plurality of motors;
a receiving unit that receives angular velocities that have
been acquired by a plurality of angular velocity sensors
that are respectively provided for the plurality of rotation shafts; and
a positional relationship acquiring unit that acquires a
positional relationship between the plurality of rotation
shafts, using the angular velocities acquired by the
plurality of angular velocity sensors and received by
the receiving unit when the plurality of rotation shafts
have been rotated by the motor control unit one by one,
wherein the robot has a link row that includes a plurality
of links that are coupled to each other by a plurality of
joints that respectively correspond to the plurality of
rotation shafts,
the positional relationship is a positional relationship
between the rotation shafts in the link row, and
the positional relationship acquiring unit is configured to:
rotate a particular rotation shaft;
classify other rotation shafts into a first group having a
first angular velocity and a second group having a
second angular velocity; and
determine that a position of the particular rotation shaft
is located between the first group of rotation shafts
and the second group of rotation shafts.

5. A positional relationship acquiring method comprising:
a motor control step of controlling a plurality of motors of
a robot that has a plurality of rotation shafts that are
respectively driven by the plurality of motors, thereby
rotating the plurality of rotation shafts one by one;
a receiving step of, when the plurality of rotation shafts
are rotated one by one in the motor control step,
receiving angular velocities that have been acquired by
a plurality of angular velocity sensors that are respectively provided for the plurality of rotation shafts; and
a positional relationship acquiring step of acquiring a
positional relationship between the plurality of rotation
shafts, using the angular velocities that have been
acquired by the plurality of angular velocity sensors
when the plurality of rotation shafts have been rotated
one by one,
wherein the robot has a link row that includes a plurality
of links that are coupled to each other by a plurality of
joints that respectively correspond to the plurality of
rotation shafts,
the positional relationship is a positional relationship
between the rotation shafts in the link row, and
the positional relationship acquiring step comprises:
rotating a particular rotation shaft;
classifying other rotation shafts into a first group having a first angular velocity and a second group
having a second angular velocity; and
determining that a position of the particular rotation
shaft is located between the first group of rotation
shafts and the second group of rotation shafts.

6. A computer program product including a non-transitory
computer readable medium having stored thereon computer
executable instructions that, when executed on a compute,
configure the computer to perform a method comprising the
steps of:
a motor control step of controlling a plurality of motors of
a robot that has a plurality of rotation shafts that are
respectively driven by the plurality of motors, thereby
rotating the plurality of rotation shafts one by one;
a receiving step of, when the plurality of rotation shafts
are rotated one by one in the motor control step,
receiving angular velocities that have been acquired by
a plurality of angular velocity sensors that are respectively provided for the plurality of rotation shafts; and
a positional relationship acquiring step of acquiring a
positional relationship between the plurality of rotation
shafts, using the angular velocities that have been
acquired by the plurality of angular velocity sensors
when the plurality of rotation shafts have been rotated
one by one,
wherein the robot has a link row that includes a plurality
of links that are coupled to each other by a plurality of
joints that respectively correspond to the plurality of
rotation shafts,
the positional relationship is a positional relationship
between the rotation shafts in the link row, and
the positional relationship acquiring step comprises:
rotating a particular rotation shaft;
classifying other rotation shafts into a first group having a first angular velocity and a second group
having a second angular velocity; and
determining that a position of the particular rotation
shaft is located between the first group of rotation
shafts and the second group of rotation shafts.

* * * * *